United States Patent
Zheng et al.

(10) Patent No.: US 7,603,000 B2
(45) Date of Patent: Oct. 13, 2009

(54) SYSTEM AND METHOD FOR LEARNING RELATIVE DISTANCE IN A SHAPE SPACE USING IMAGE BASED FEATURES

(75) Inventors: Yefeng Zheng, Plainsboro, NJ (US); Xiang Zhou, Exton, PA (US); Shaohua Kevin Zhou, Plainsboro, NJ (US); Bogdan Georgescu, Plainsboro, NJ (US); Dorin Comaniciu, Princeton Junction, NJ (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 678 days.

(21) Appl. No.: 11/464,851

(22) Filed: Aug. 16, 2006

(65) Prior Publication Data

US 2007/0046696 A1   Mar. 1, 2007

Related U.S. Application Data

(60) Provisional application No. 60/712,960, filed on Aug. 31, 2005.

(51) Int. Cl.
*G06K 9/60* (2006.01)

(52) U.S. Cl. .................. 382/305; 382/286; 382/291

(58) Field of Classification Search .......... 382/282, 382/286, 291, 296, 305
See application file for complete search history.

(56) References Cited

U.S. PATENT DOCUMENTS

| | | | | |
|---|---|---|---|---|
| 6,610,256 | B2 * | 8/2003 | Schwartz | 422/186 |
| 7,049,074 | B2 * | 5/2006 | Schwartz | 435/6 |
| 7,088,850 | B2 * | 8/2006 | Wei et al. | 382/128 |
| 7,187,800 | B2 * | 3/2007 | Hibbard | 382/173 |

* cited by examiner

*Primary Examiner*—Yosef Kassa

(57) ABSTRACT

A system and method for identifying a shape of an anatomical structure in an input image is disclosed. An input image is received and warped using a set of warping templates resulting in a set of warped images. An integral image is calculated for each warped image. Selected features are extracted based on the integral image. A boosted feature score is calculated for the combined selected features for each warped image. The warped images are ranked based on the boosted feature scores. A predetermined number of warped images are selected that have the largest feature scores. Each selected warped image is associated with its corresponding warping template. The corresponding warping templates are associated with stored shape models. The shape of the input image is identified based on the weighted average of the shapes models.

14 Claims, 6 Drawing Sheets

SYSTEM AND METHOD FOR LEARNING RELATIVE DISTANCE IN A SHAPE SPACE USING IMAGE BASED FEATURES

CROSS REFERENCE TO RELATED APPLICATION

This application claims the benefit of U.S. Provisional Patent Application Ser. No. 60/712,960, filed on Aug. 31, 2005, which is incorporated by reference in its entirety.

FIELD OF THE INVENTION

The present invention is directed to a system and method for learning relative distance in a shape space using image based features, and more particularly, to a system and method for a machine learning based approach to achieve a refined shape detection result.

BACKGROUND OF THE INVENTION

It is widely accepted that prior knowledge about a target shape is important and should be used in shape detection. How to effectively use the prior knowledge has long been an active research topic in non-rigid shape detection. The Active Contour Model (ACM) and other energy minimization approaches have become a standard tool for non-rigid shape detection, where the prior knowledge is encoded into an energy function. An active contour is driven by the external and internal forces. The external force is derived from input images, while the internal force incorporates the prior knowledge of the target shape. In a standard setting, ACMs use two parameters to adjust the elasticity and stiffness of the shape. With such a limited flexibility, very little prior knowledge can be exploited by ACMs and the contour often converges to an unrealistic shape.

To mitigate this problem, the Active Shape Model (ASM) models the deformation of a shape differently. Given a set of shapes, the Principal Component Analysis (PCA) is applied to the shape space. The deformation of the shape is constrained to a subspace spanned by the eigenvectors associated with the largest eigenvalues. The searching space can be further restricted to a hypercube. By adjusting the number of principal components preserved, ASM can achieve a trade-off between the representation capability of the model and the constraints on the shape. If all principal components are used, ASM can represent any shape but no prior knowledge of the shape is used. On the other hand, if too few principal components are retained, an input shape cannot be well represented by the subspace. Therefore, there is an upper-bound of the detection accuracy given a specified choice of parameters. Both ACM and ASM only use the image contents around the shape boundaries, so they are more suitable for shapes with strong edges. The Active Appearance Model (AAM) is a natural extension of ASM, where the variation of the appearance is constrained to a subspace too.

Shape detection can also be formulated as a classification problem: whether a given image block contains the target shape. Exhaustive searching in the similarity transformation space is often used to estimate the translation, rotation, and scale of the shape in an input image. For example, the Ada-Boost algorithm can be used for face detection. Given a large pool of simple features, AdaBoost can select a small feature set and the corresponding optimal weights for classification. The convolutional neural network (CNN) is another classification based approach combining feature extraction, selection and classifier training into the same framework. As a specially designed neural network, CNN is especially effective for two dimensional images. One drawback of these classification based approaches is that only the similarity deformation of the shape can be estimated.

Since it is hard to handcraft the prior knowledge in a shape detection framework, a method that directly exploits the expert annotation of the target shape in a large database is preferred. One known approach directly learns a regression function for the positions of the control points. Though simple and elegant, the regression output is a multi-dimensional vector (often in the order of 100 for shape detection, depending on the application). Since regression for multi-dimensional output is hard, PCA is often exploited to restrict the shape deformation space. So, it suffers from the same limitations as ASM and AAM. Another known approach uses a shape inference method to search for the most similar shape in the database. Particularly, the training set is clustered in the shape space into several clusters. A set of image features are selected to maximize the Fisher separation criterion. During shape detection, the input and training images are compared in the feature space to select a similar example shape for the input. As a heuristic metric, the Fisher separation criterion is optimal for very limited cases, such as the Gaussian distribution with the same covariance matrix. Both of the above approaches need a preprocessing step to estimate the rough position of a shape, which is often realized using a classification based approach.

SUMMARY OF THE INVENTION

The present invention is directed to a method for populating a database with a set of images of an anatomical structure. The database is used to identify a shape of an anatomical structure in an input image. A set of images of anatomical structures is received. Each image is annotated with a plurality of control points that identify a contour of the anatomical structure. A reference shape is identified for the image set. A warping template is calculated for each image in the image set that warps that image into approximately the reference shape. A matrix of images is created by applying each warping template calculated for each image in the image set to all of the images in the image set. A shape difference for each image in the matrix is computed by computing a distance measurement between each warped shape and the reference shape. The images are ranked based on the distance measurement. A set of features associated with the images are identified. Feature scores are computed for each image in the matrix. A ranking boosting process is used to select that combination of features that result in feature scores that produce a rank that is consistent with the rank associated with the warped image. The annotated contours of the anatomical structure, warping templates and the selected feature combination are stored in the database.

The present invention is also directed to a system and method for identifying a shape of an anatomical structure in an input image. An input image is received and warped using a set of warping templates resulting in a set of warped images. An integral image is calculated for each warped image. Selected features are extracted based on the integral image. A boosted feature score is calculated for the combined selected features for each warped image. The warped images are ranked based on the boosted feature scores. A predetermined number of warped images are selected that have the largest feature scores. Each selected warped image is associated with its corresponding warping template. The corresponding warping templates are associated with stored shape models.

The shape of the input image is identified based on the weighted average of the shapes models.

BRIEF DESCRIPTION OF THE DRAWINGS

Preferred embodiments of the present invention will be described below in more detail, wherein like reference numerals indicate like elements, with reference to the accompanying drawings.

DETAILED DESCRIPTION

The present invention is directed to a novel learning based approach for non-rigid shape detection. The present invention can output a refined detection result without the restriction to the similarity deformation. A model is trained that has the largest response on the reference shape and a smaller response on other shapes. In the examples that will be described, the reference shape is the mean shape. However, it is to be understood by those skilled in the art, that the reference shape can be defined differently for different applications. The response of the model can be seen as a measure of the distance between a shape and the reference shape. During shape detection, an optimal deformation is searched for which maximizes the response of the trained model. The optimal deformation corresponds to the optimal shape detection result. As a result, the trained shape model distinguishes the reference shape from all other shapes.

The present invention can be used to detect anatomical structures. An example where such a method would be utilized is for detecting regional wall motion abnormalities in the heart by detection and segmentation of the ventricle endocardial or epicardial borders through machine learning, or classification, and by identifying similar cases from annotated databases. It is to be understood by those skilled in the art that the present invention may be used in other applications where shape detection is useful such as, but not limited to, recognizing human features such as facial features or other body features. The present invention can also be used in 2 dimensional, 3 dimensional and 4 dimensional (3D+time) data analysis, such as medical analysis of anatomical structures such as the heart, lungs or tumors, which can be evolving over time.

Figure 1:
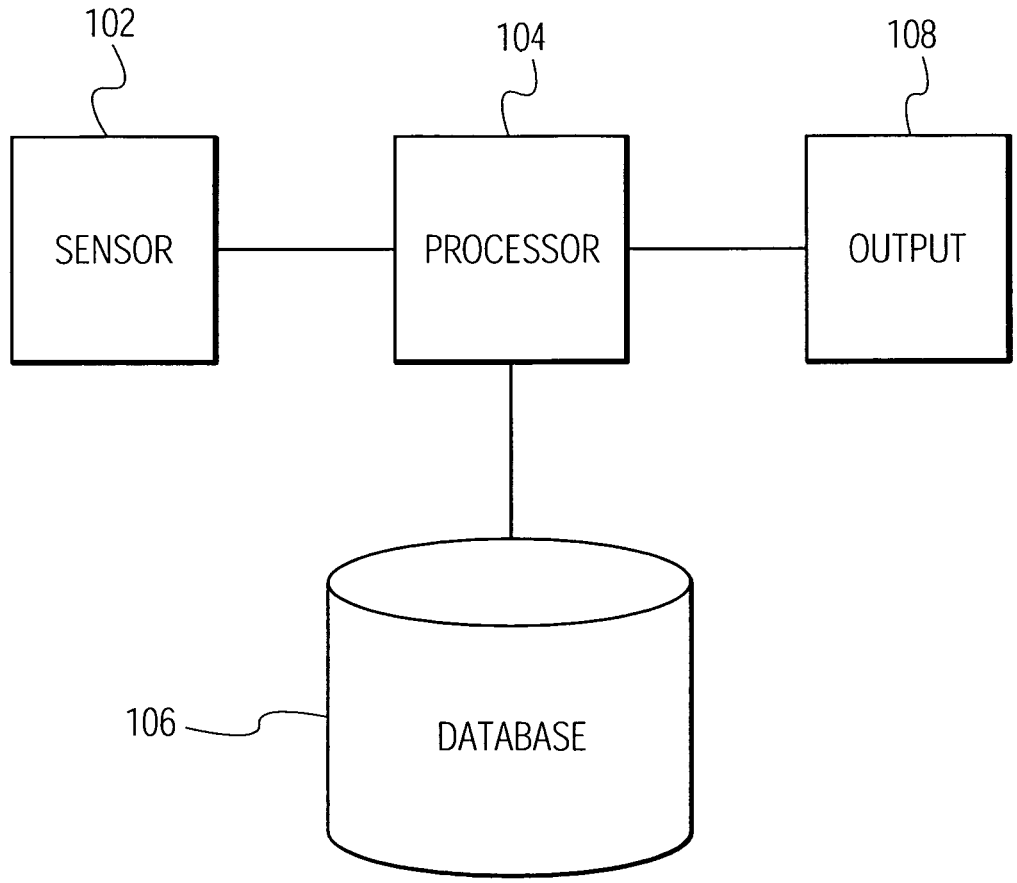
FIG. 1 illustrates an exemplary architecture of an echocardiograph system that uses a method for detecting a shape of an object in accordance with the present invention.

For purposes of describing the present invention, an example will be described for detecting the endocardial wall of the left ventricle of a human heart. FIG. 1 illustrates an exemplary architecture of an echocardiograph system that uses a method for detecting the shape of an object in accordance with the present invention. A medical sensor 102, such as an ultrasound transducer is used to perform an examination on a patient. The sensor 102 is used to obtain medical measurements consistent with a particular medical examination. For example, a patient experiencing heart problems may have an echocardiogram performed to help diagnose the particular heart ailment. An ultrasound system provides two-, three-, and four (3D+time)-dimensional images of the heart from various perspectives.

The information obtained by the sensor 102 is communicated to a processor 104 which may be a workstation or personal computer. The processor 104 converts the sensor data into an image that is communicated to display 108. The display 108 may also communicate other graphical information or tables of information relating to the image.

In addition to data from the medical sensor 102, the processor 104 may also receive other data inputs. For example, the processor may receive data from a database 106 associated with the processor 104. Such data may include images of left ventricles that are representative of a plurality of patients or may be computer generated models of contour shapes based on statistical information. The images may also be obtained from different imaging machines and taken by different sonographers. The images are all annotated by experts and processed by the processor 104 using warping templates and boosting as will be described in greater detail hereinafter.

Figure 7:
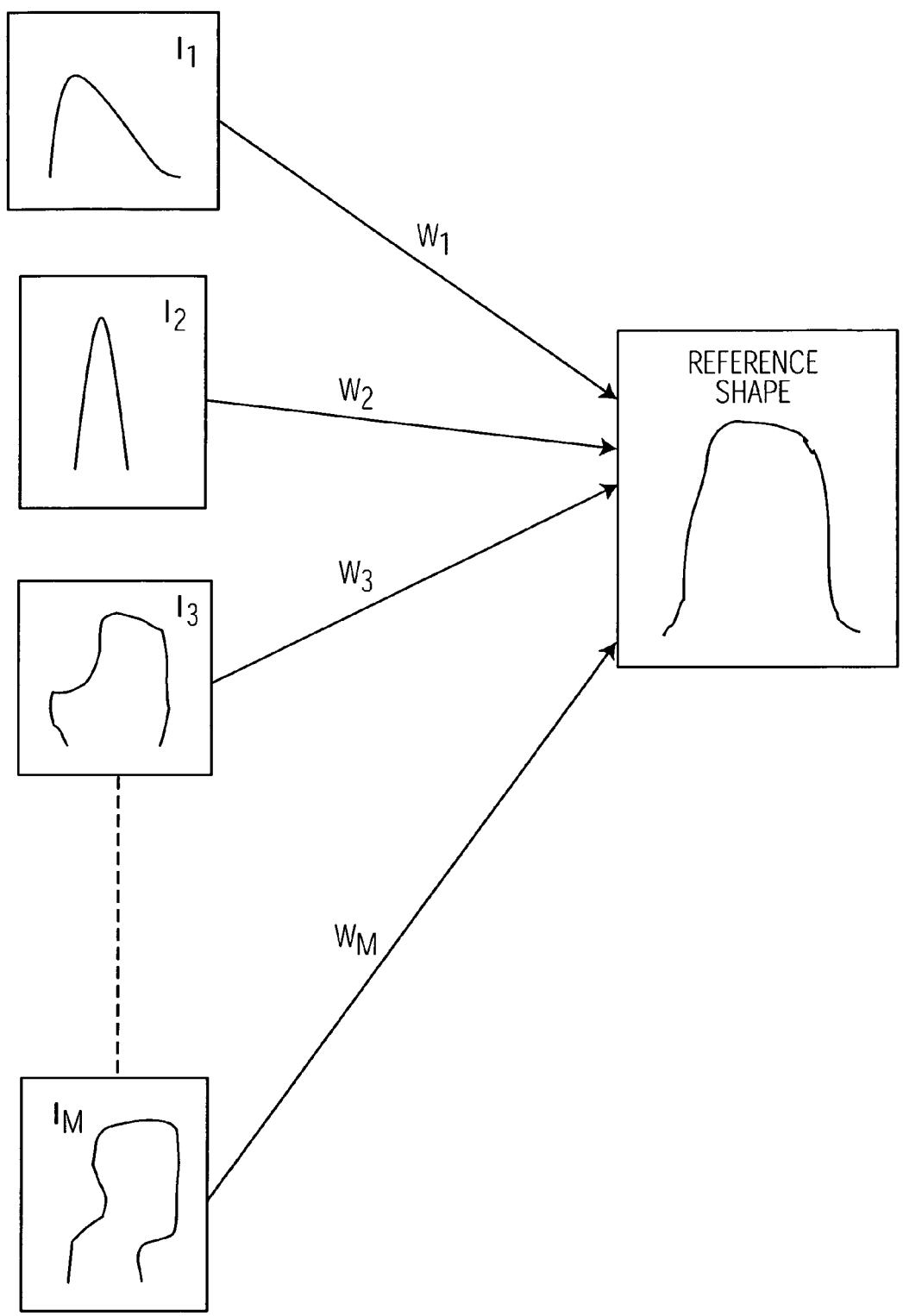
FIG. 7 illustrates a set of training images that have annotated shapes and a resulting mean shape in accordance with the present invention.

In accordance with the present invention, a model is trained that has the largest response on the reference shape and a smaller response on all other shapes. The model response is taken as a measure of the relative distance between a shape and the reference shape. Since the absolute magnitude of the distance measure is irrelevant, the learning is formulated as a ranking problem. As shown in FIG. 7, a set of training images $I_1, I_2, \ldots I_M$ and corresponding annotated shapes $S_1, S_2, \ldots S_M$ are used. Each shape $S_i$ is represented with N control points $P_i^n$, $n=1,2, \ldots, N$. The reference shape can be arbitrary.

To reduce the distortion introduced in warping, the mean shape is used as the reference shape. The mean shape of the training set is $\bar{S}$, which can be calculated using the generalized Procrustes analysis. For each shape $S_i$ there is a warping template $W_i$ which warps $S_i$ toward the mean shape $\bar{S}_i$. Given a training image $I_i$, M warped images can be synthesized $I_i^1$, $I_i^2, \ldots I_i^M$ using warping templates $W_1, W_2, \ldots, W_M$, respectively. Here $I_i^j$ is the warped image using image $I_i$ and warping template $W_j$.

Figure 8:
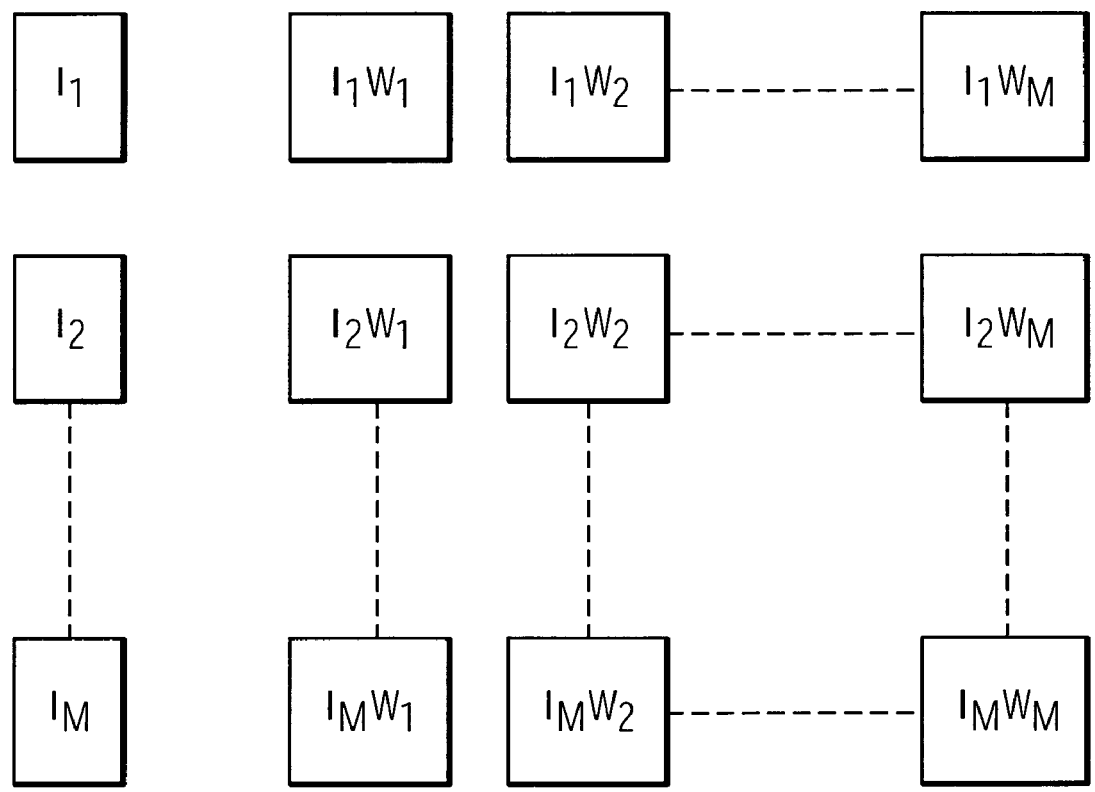
FIG. 8 illustrates a set of warped training images in accordance with the present invention.

FIG. 8 illustrates a representative set of warped training images in accordance with the present invention. Images $I_1, I_2, \ldots I_M$ are shown. The warping templates, $W_1, W_2, \ldots W_M$, are applied to each image resulting in a set of warped images as shown. These M synthesized images $I_i^j$, $j=1,2, \ldots, M$ can be sorted in the ascending order according to the shape distance $D_{i,j}$, which is defined as the average Euclidean distance between corresponding control points $$D_{i,j} = \frac{1}{N} \sum_{n=1}^{N} \|P_i^n - P_j^n\| \tag{1}$$

Synthesized images can also be sorted in the deformed shape space. If the shape of a warped image $I_i^j$ is $S_i^j$, images $I_i^j$ for $j=1, 2, \ldots, M$ can be sorted using the distance between $S_i^j$ and the mean shape. Since the warping used in the present invention is smooth, the difference between these two methods is small for warped images ranked on top.

Figure 2:
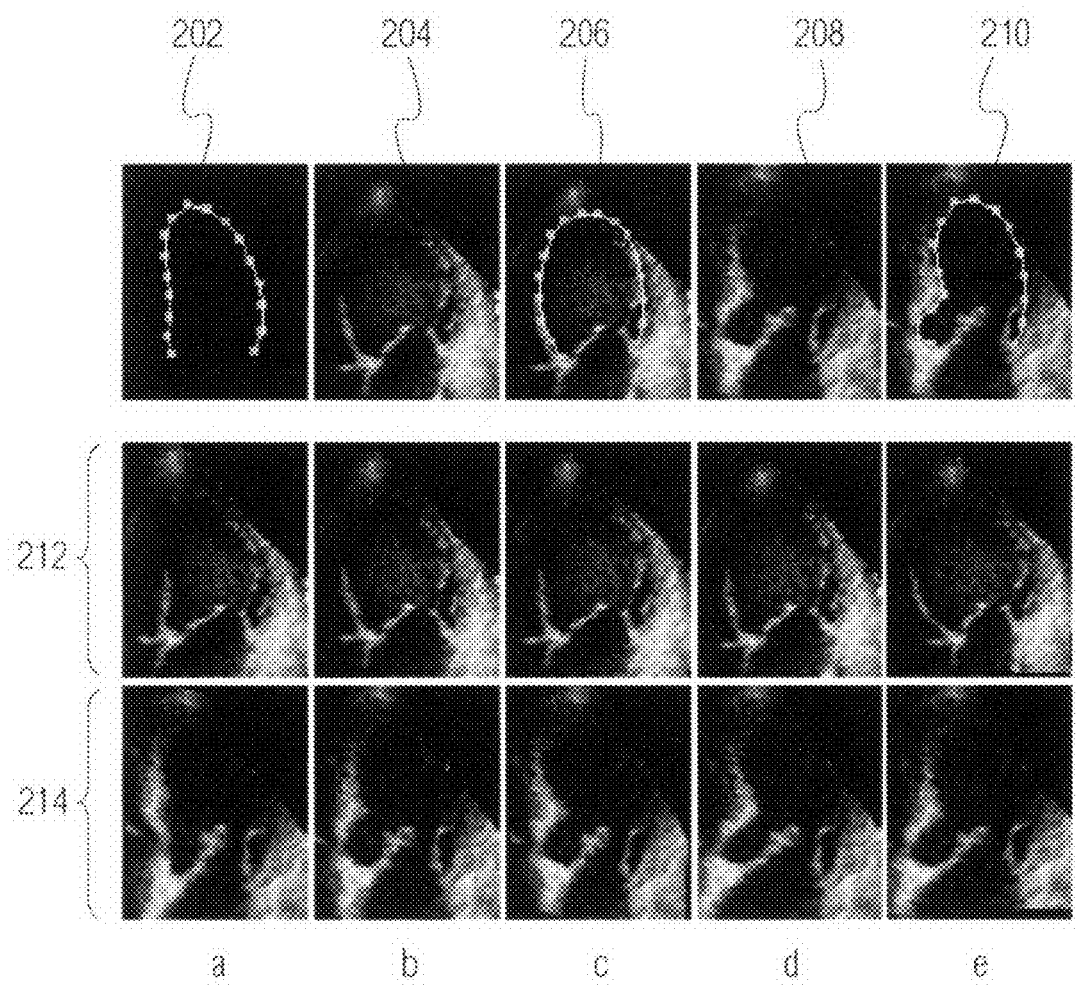
FIGS. 2a-2e illustrate image warping for an ultrasound heart data set in accordance with the present invention.

The warped image using the perfect warping template $I_i^i$, should be ranked on the top. By repeating the image synthesis for all training images, M ranked image lists are obtained which have the following two characteristics. First, all synthesized images using the same image have the same appearance but a different shape. Second, all synthesized images that are ranked on the top in their own lists have the same shape (the mean shape $\overline{S}$) but different appearance. FIG. 2 illustrates image warping for an ultrasound heart data set in accordance with the present invention as will be described in further detail hereinafter.

Given a shape, it is desired to calculate the warping from it to the mean shape. A Thin Plate Spline (TPS) model can be used for representing flexible coordinate transformations. The advantages of TPS are 1) the interpolation is smooth with derivatives of any order; 2) the model has no free parameters that need manual tuning; 3) it has closed-form solutions for both warping and parameter estimation; and 4) there is a physical explanation for its energy function. In accordance with the present invention, two TPS models are used for a 2-D coordinate transformation. If control point $(x_i, y_i)$ corresponds to $(u_i, v_i)$ for $i=1, 2, \ldots, N$, let $z_i=f(x_i, y_i)$ be the target function value at location $(x_i, y_i)$. One continuous transformation for each coordinate is obtained by setting $z_i$ equal to $u_i$ and $v_i$ in turn. The TPS interpolant $f(x, y)$ minimizes the following bending energy $$I_f = \iint_{R^2} \left(\frac{\partial^2 f}{\partial x^2}\right) + 2\left(\frac{\partial^2 f}{\partial x \partial y}\right)^2 + \left(\frac{\partial^2 f}{\partial y^2}\right)^2 dx dy \tag{2}$$

and has the solution of the form $$f(x, y) = a_1 + a_x x + a_y y + \sum_{i=1}^{N} w_i U(\|(x_i, y_i) - (x, y)\|) \tag{3}$$

where $U(r)$ is the kernel function, taking the form of $U(r)=r^2 \log r^2$. The parameters of the TPS models w and a are the solution of the following linear equation $$\begin{bmatrix} K & P \\ P^T & 0 \end{bmatrix} \begin{bmatrix} w \\ a \end{bmatrix} = \begin{bmatrix} z \\ 0 \end{bmatrix} \tag{4}$$

where $K_{i,j}=U(\|(x_i, y_i)-(x_j, y_j)\|)$; the ith row of P is $(1,x_i,y_i)$; w and z are column vectors formed from $w_i$ and $z_i$, respectively; and a is the column vector with elements $a_1$, $a_x$, and $a_y$.

To avoid holes in the warped image, the warping is calculated from the mean shape to input shape. For each pixel in the warped image, its position is calculated in the input image. To reduce the computation, the simple closest pixel approximation is used to round the warped position to the integer grid. This warping information can he saved as a look up table. The expensive calculation of equation (3) is only performed once and is done off line.

Referring back to FIG. 2, there is shown a set of ultrasound images of the left ventricle and image warping for the data set. FIG. 2a is an image 202 that shows the mean shape of a left ventricle endocardial border in an ultrasound heart data set that is labeled using 17 control points. The neighboring control points are connected to visualize the endocardial border more clearly. FIGS. 2b and 2d show two images 204, 208 and the corresponding image shapes are shown in FIGS. 2c and 2e 206, 210. Some synthesized images using images 2b and 2d are shown in the second and third rows 212, 214, respectively. The images are sorted in ascending order from left to right using the distance between input shape and the warping shapes. The ranks of these images from left to right are 1, 5, 10, 50 and 100.

In accordance with the present invention, a RankBoost learning approach is used to learn the ranking of the synthesized image. The goal of the RankBoost learning approach is to minimize the weighted number of pairs of instances that are mis-ordered by the final ranking relative to the given ground truth. A ground truth is provided relating to the relative ranking of an individual pair of instances $x_0$ and $x_1$. If instance $x_1$ is not ranked above $x_0$, a penalty $D(x_0, x_1)$ is imposed. For an equal weighted penalty $D(x_0, x_1)=1$. For no preference between $x_0$ and $x_1$, $D(x_0, x_1)=0$. The penalty weights $D(x_0, x_1)$ can be normalized to a probability distribution $$\sum_{x_0, x_1} D(x_0, x_1) = 1 \tag{5}$$

The learning goal is searching for a final ranking function H that minimizes the ranking loss $$rloss_D(H) = \sum_{x_0, x_1} D(x_0, x_1)[[H(x_1) \leq H(x_0)]] \tag{6}$$

Here, $[[\pi]]$ is defined to be 1 if predicate $\pi$ holds and 0 otherwise. The instances are sorted in the descending order with respect to H. The RankBoost algorithm is as follows:

Given: Initial distribution D over X×X.

Initialize: $D_1=D$.

For $t=1,2, \ldots, T$

Train weak learner using distribution $D_t$ to get weak ranking $h_1: X \to R$.

Choose $\alpha_1 \in R$

Update:

$$D_{t+1(x_0, x_1)} = \frac{D_t(x_0, x_1)\exp[\alpha_t(h_t(x_0) - h_t(x_1))]}{Z_t}$$

Where $Z_t$ is a normalization factor (chosen so that $D_{t+1}$ will be a distribution).

Output the final ranking: $H(x)=\Sigma_{t=1}^{T}\alpha_1 h_t(x)$.

A ranking ground truth is bipartite if there exists disjoint subsets $X_0$ and $X_1$ of X such that the ground truth ranks all instances of $X_1$ above all instances in $X_0$ and says nothing about any other pairs. For a ranked image list, the top l images are ranked above all of the remaining images. Since the relative ranking of synthesized images in different lists is not important, the ground truth is not bipartite itself but rather a union of bipartite sets. Naturally, l=1 should be used. In accordance with one embodiment of the present invention, example based searching is used for shape detecting and will be described in further detail hereinafter. The top several closest prototypes are selected in the database. The weighted average of the selected shapes is taken as the detection result. A slightly larger l is used (l=5 in the embodiment).

There is an upper bound ranking loss $\text{rloss}_D(H)$ on the training set. At time t:

$$Z_t = \sum_{x_0, x_1} D_t(x_0, x_1) \exp[\alpha_t(h_t(x_0) - h_t(x_1))] \qquad (7)$$

The ranking loss of H on the training set is upper-bounded as $$\text{rloss}_D(H) \leq \Pi_{t=1}^T Z_t \qquad (8)$$

For any given weak ranking function $h_t$, it can be shown that $Z_t$ is a convex function of $\alpha_t$ and has a unique minimum. The optimal $\alpha_t$ can be found numerically using the Newton-Raphson method. In accordance with the present invention, each weaker learner uses only one feature. For each feature, an optimal $\alpha_t$ is searched for to minimize $Z_t$. The feature with the smallest $Z_t$ value is selected as the weaker learner. So, the weaker learner training and optimal $\alpha_t$ searching are finished in one step.

Figure 3A:
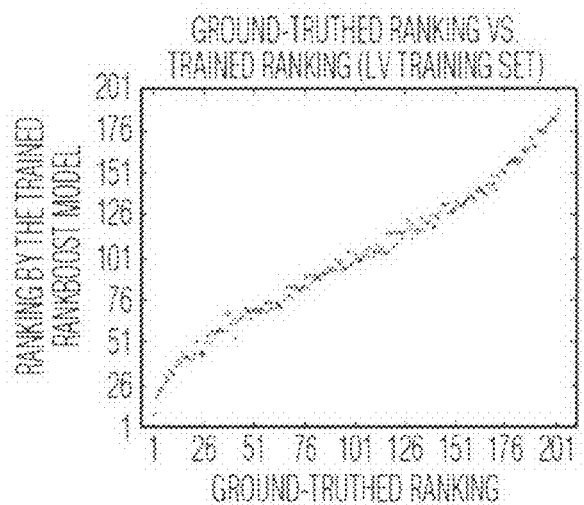
FIGS. 3a and 3b illustrate ground truth ranking vs. average ranking by the RankBoost model for left ventricle endocardial border detection in accordance with the present invention.
Figure 3B:
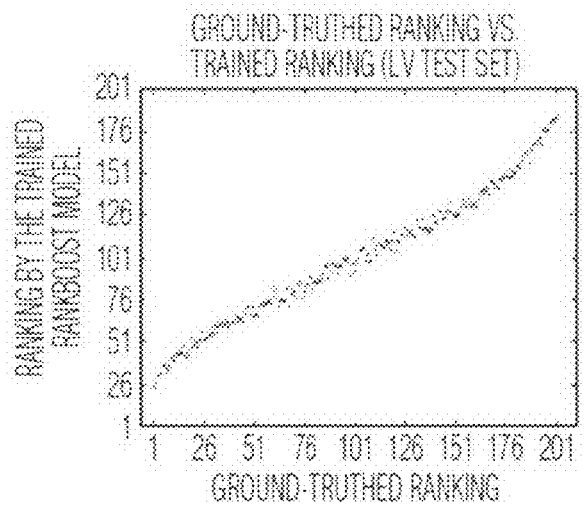

FIGS. 3a and 3b show the ground truth ranking vs. the average ranking by the trained RankBoost model for the left ventricle endocardial border detection. FIG. 3a represents the results obtained from the training set and FIG. 3b represents the results from the test set. As can be seen, the ranking of the RankBoost model matches well with the ground truth.

With bipartite ground truth, the ranking problem is very similar to the classification problem. Formulated as a classification problem, instances in $X_1$ and $X_0$ form the positive and negative training samples, respectively. It is very easy to verify that the objective function $\text{rloss}_D(H)$ of RankBoost, Equation (6) is equivalent to the error rate in AdaBoost which can also be used for classification problems. In accordance with the present invention, the ground truth is not bipartite itself, but a union of bipartite subsets. The focus is on the relative ranking of synthesized images that are generated using the same image but different warping templates, e.g., $I_i^m$ and $I_i^n$ when m≠n. The relative ranking of two synthesized images warped from different images are not relevant, e.g., $I_i^m$ and $I_j^n$ if i≠j. Due to this difference, our ranking formulation is not equivalent to a classification problem. Using our formulation, the learning algorithm concentrates on learning the shape difference since the instances to be ranked have the same appearance but different shapes.

A feature template comprises several rectangular regions. The response of a feature is defined as the sum of intensities in some rectangles subtracted by the sum of intensities in the other rectangles. By moving and scaling the feature templates, a big feature pool (often in the magnitude of one million features) can be achieved. The feature extraction can be implemented efficiently based on integral images.

The following will describe a method for detecting a shape given an input image with an unknown shape. An input image is warped using a warping template $W_i$, where i=1, 2, . . . , M. For each warped image, the integral image is calculated. Selected features are extracted based on the integral image. Next, the combined response of the trained RankBoost model is calculated. The top k candidates with the largest responses are selected. The kernel-weighted average is taken as the shape detection result.

In accordance with the present invention, a Nadraya-Watson kernel-weighted average is used as the final shape detection result $$\hat{S} = \frac{\sum_{i=1}^M K_k(d_i) S_i}{\sum_{i=1}^M K_k(d_k)} \qquad (9)$$

where, $$d_i = 1 - \frac{H_i - \min\{H_j\}}{\max\{H_j\} - \min\{H_j\}} \qquad (10)$$

Since the response $H_i$ of the RankBoost model is not a distance measure, it is normalized to the range of [0,1] using the above equation. For the kernel $K_k$, the Epanechnikov quadratic equation is used $$K_k(d_i) = \begin{cases} 3/4\left[1 - \left(\frac{d_i}{d_{[k]}}\right)^2\right] & \text{if } d_i \leq d_{[k]} \\ 0 & \text{otherwise} \end{cases} \qquad (11)$$

where k is the size of the neighborhood, and $d_{[k]}$ means the distance of the top $k^{th}$ prototype. Using kernel-based smoothing, the detected shape is not restricted to those represented in the training set. Any shape can be represented as a linear combination of a set of base shapes, which fully span the whole shape space.

The major computations include image warping, integral images calculation, and feature extraction. The speed of this approach depends on the input image size and the number of warping templates. For left ventricle border detection, the input image block size is 80×104 pixels. When 202 warping templates are used, the whole computation to detect the shape in an input image block takes about 23.8 ms on a PC with dual 2.4 GHz Xeon CPU's and 2 GB memory. The decomposed computation time for one input is 12.5 ms (52.8%) for image warping, 8.7 ms (36.8%) for integral image calculation, and 2.0 ms (8.4%) for feature extraction.

Figure 4:
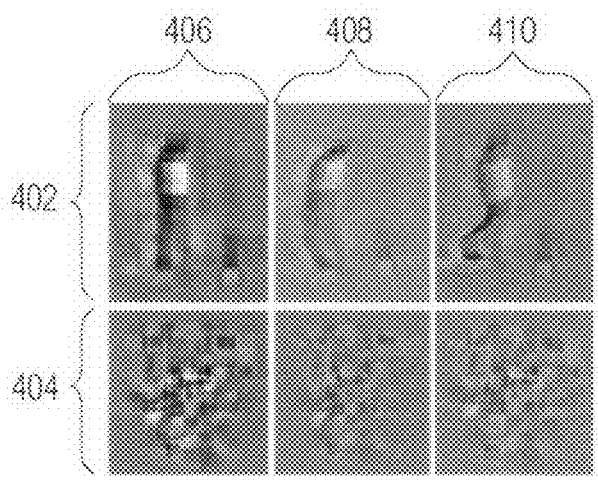
FIG. 4 illustrates weight images learned by RankBoost for left ventricle endocardial border detection and facial feature detection in accordance with the present invention.

In the feature pool, each feature is a linear combination of the intensities and the RankBoost model is a linear combination of the selected features as shown in the RankBoost algorithm above. So, overall, the response of the trained RankBoost model is a linear combination of the intensities. The combination weights can be organized as an image. FIG. 4 shows weight images learned by RankBoost in accordance with the present invention. The top row 402 shows weight images for left ventricle endocardial border detection. The bottom row 404 shows weight images for facial feature detection. The left column 406 shows the weight images aligned with mean shapes. Using weight images, shape detection is equivalent to searching for a warping template to maximize the dot-product of the warped image and the weighted image.

$$\hat{W} = \underset{W_i}{\arg\max} I^i I_w \qquad (12)$$

Here, $I^i$ is the warped image using warping template $W_i$ and $I_w$ is the weight image. Image warping and dot product calculation can be combined to achieve a more efficient implementation. The weight image is back warped using each warping template, and all the back warped weight images are stored.

This operation can be performed off line. In FIG. 4, the middle column 408 and right column 410 show two back-warped weight images. In shape detection, the dot product of the input image and a back-warped weight image is calculated to calculate the response of the corresponding warping template.

Besides increasing the speed, the weight image based approach also provides more flexibility in feature design and warping interpolation. Any feature based on the linear combination of pixel intensities can be used. In image warping, more accurate approximation, such as bilinear interpolation can be used as long as the Interpolation is linear.

Figure 5:
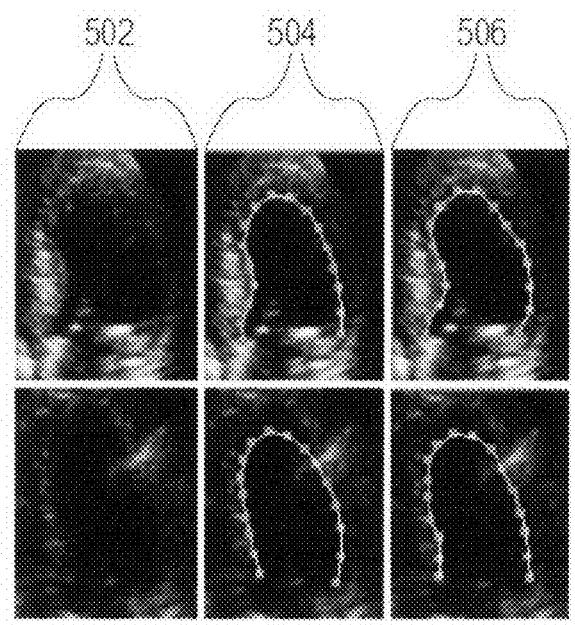
FIG. 5 illustrates an example for left ventricle endocardial border detection in accordance with the present invention.

An example will now be described with respect to detection of a left ventricle endocardial border in ultrasound images. Measuring the ventricular blood volume and the motion of the ventricular border over various stages of the cardiac cycle are components with strong diagnostic power. The left ventricle is of particular interest because it pumps oxygenated blood out to distant tissues in the entire body. As shown in FIG. 5, ultrasound images are often affected by speckle noise, signal dropout and imaging artifacts. In many cases, there is no clear border definition. The first column 502 shows the input images. The middle column 504 shows the endocardial border as detected by using the method of the present invention. The third column illustrates an expert drawn contour. As can be seen, the present invention provides good detection results.

Figure 6:
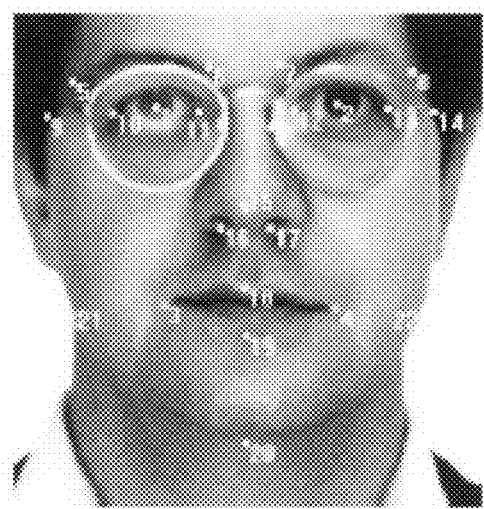
FIG. 6 illustrates a manual markup of a face for use in a method for facial detection in accordance with the present invention.

The present invention can also be used for facial detection as illustrated in FIG. 6. A database contains a plurality of images of female and male subjects. Multiple images of each subject were taken in which the subject exhibits frontal view faces with different facial expressions, illumination conditions and occlusions (e.g., sunglasses, scarf, etc.). Each image is marked up by an expert. The database can be trained to detect various facial characteristics.

Having described embodiments for a method for learning relative distance in a shape space using image based features, it is noted that modifications and variations can be made by persons skilled in the art in light of the above teachings. It is therefore to be understood that changes may be made in the particular embodiments of the invention disclosed which are within the scope and spirit of the invention as defined by the appended claims. Having thus described the invention with the details and particularity required by the patent laws, what is claimed and desired protected by Letters Patent is set forth in the appended claims.

We claim:

1. A method for populating a database with a set of images of an anatomical structure, the database being used to identify a shape of an anatomical structure in an input image, the method comprising the steps of:
   receiving a set of images of anatomical structures, each image being annotated with a plurality of control points that identify a contour of the anatomical structure;
   identifying a reference shape for the image set;
   calculating a warping template for each image in the image set that warps that image into approximately the reference shape;
   creating a matrix of images by applying each warping template calculated for each image in the image set to all of the images in the image set;
   computing a shape difference for each image in the matrix by computing a distance measurement between each warped shape and the reference shape;
   ranking the images based on the distance measurement;
   identifying a set of features associated with the images;
   computing feature scores for each image in the matrix;
   using a ranking boosting process to selecting those combination of features that result in feature scores that produce a rank that is consistent with the rank associated with the warped image; and
   storing the annotated contours of the anatomical structure, warping templates and the selected feature combination in the database.

2. The method of claim 1 wherein the step of computing feature scores for each image in the matrix further comprises the step of:
   assigning a weight to each feature.

3. The method of claim 1 wherein the reference shape is the mean shape of all of the anatomical structures in the image set.

4. The method of claim 1 wherein the features are Haar features.

5. The method of claim 1 wherein the anatomical structure is a left ventricle and the shape is the contour of the left ventricle.

6. The method of claim 1 wherein the images are ultrasound images.

7. A method for identifying a shape of an anatomical structure in an input image, the method comprising the steps of:
   receiving an input image;
   warping the input image using a set of warping templates resulting in a set of warped images;
   calculating an integral image for each warped image;
   extracting selected features based on the integral image;
   calculating a boosted feature score for the combined selected features for each warped image;
   ranking the warped images based on the boosted feature scores;
   selecting a predetermined number of warped images that have the largest feature scores;
   associating each selected warped image with its corresponding warping template;
   associating the corresponding warping templates with stored shape models ; and
   identifying the shape of the input image based on the weighted average of the shapes models.

8. The method of claim 7 wherein the features are Haar features.

9. The method of claim 7 wherein the anatomical structure is a left ventricle and the shape is the contour of the left ventricle.

10. The method of claim 7 wherein the images are ultrasound images.

11. A system for non-rigid shape detection of an anatomical structure in an image, the system comprising;
   a database that stores a set of images of anatomical structures, each image being annotated to indicate a contour of the shape of the anatomical structure, the database also storing selected features and combination weights;
   a processor that receives an input image of an anatomical structure, the processor performing the following steps:
      warping the input image using a warping template resulting in a set of warped versions of the input image;
      calculating an integral image for each warped image;
      extracting selected features based on the integral image;
      calculating a boosted feature score for the combined selected features for each input warped image;
      ranking the warped images based on the boosted feature scores;

selecting a predetermined number of warped images that have the largest feature scores;
associating each selected warped image with its corresponding warping template,
associating the corresponding warping templates with stored shape models;
identifying the shape of the input image based on the weighted average; and
a display to display the identified shape.

12. The system of claim 11 wherein the features are Haar features.

13. The system of claim 11 wherein the anatomical structure is a left ventricle and the shape is the contour of the left ventricle.

14. The system of claim 11 wherein the images are ultrasound images.

* * * * *